(No Model.)

T. S. BROWN.
SPROCKET GEAR.

No. 588,950. Patented Aug. 31, 1897.

WITNESSES:
A. E. Paige
F. Norman Dixon

Thomas S. Brown,
INVENTOR:
By his Attorneys,
Wm. C. Strawbridge
Bonsall Taylor

UNITED STATES PATENT OFFICE.

THOMAS S. BROWN, OF POUGHKEEPSIE, NEW YORK.

SPROCKET-GEAR.

SPECIFICATION forming part of Letters Patent No. 588,950, dated August 31, 1897.

Application filed January 20, 1897. Serial No. 619,949. (No model.)

*To all whom it may concern:*

Be it known that I, THOMAS S. BROWN, a citizen of the United States, residing at Poughkeepsie, in the county of Dutchess and State of New York, have invented certain new and useful Improvements in Sprocket-Gears, of which the following is a specification.

My invention relates to sprocket gears and chains, the same being devices well known in the engineering arts, especially as employed in bicycles, reapers and mowers, elevators, conveyers, and many other forms of apparatus.

In the use of sprocket gears as heretofore constructed, the constant friction between the teeth of the wheels and the links of the chains, occasions the wearing away of both at the points of contact, thereby destroying the proper relation between the sprocket chain links, and the wheel teeth, with the result that, after such wearing away has occurred, further use of the gear is attended by the disadvantages of rattling and lost motion, with the further and more serious objection that the chain is liable to ride upon the crests of the teeth and be broken or thrown from the wheel.

It is the object of my invention to provide a sprocket gear of such construction that the inevitable wearing of the parts in use will be compensated for in such a manner as to obviate the disadvantages referred to.

In the accompanying drawings I show, and herein I describe, a good form of a preferred embodiment of my invention,—as well also as one of a number of possible modifications of the same,—the particular subject-matter claimed as novel being hereinafter definitely specified.

In the accompanying drawings.

Similar letters of reference indicate corresponding parts.

Figure 1:
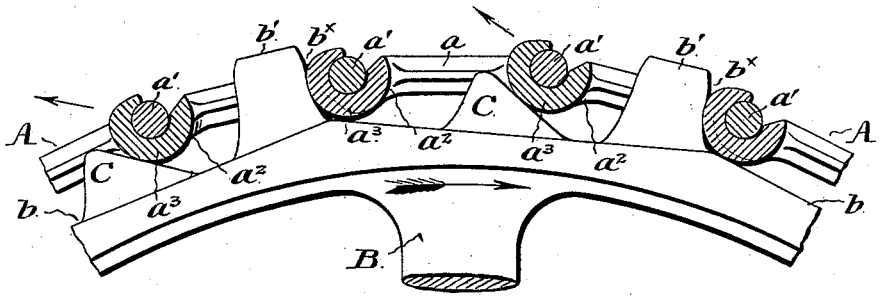
Figure 1 is a view in side elevation, partly sectional, of a sprocket wheel, and chain, respectively, embodying a preferred form of my invention, the parts being represented as slightly worn.
Figure 2:
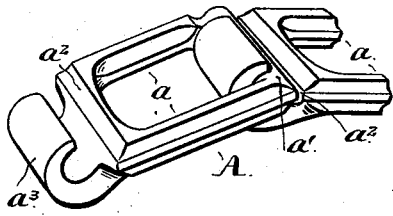
Figure 2 is a view in perspective of a section of a sprocket chain of a well-known construction.

The sprocket chain A, illustrated in Figures 1 and 2 of the drawings, is one in which each link embodies side bars $a$, and two transverse end bars, respectively designated $a'$ and $a^2$, the end bar $a^2$ of each link being provided with an open socket or knuckle $a^3$, adapted to receive and temporarily retain the end bar $a'$ of the next succeeding link. This particular construction of chain, the use of which, however, is not essential to my invention, is well known.

Figure 3:
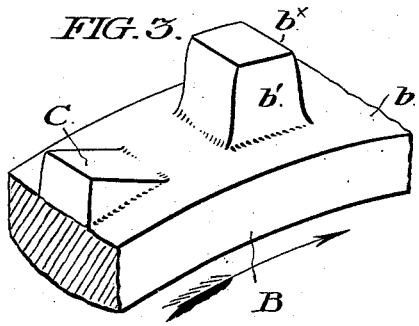
Figure 3 is a view in perspective of a portion of the rim of a sprocket wheel, adapted to operate with said chain.

The sprocket wheel B, shown in Figures 1 and 3, is provided with a rim $b$, upon the surface of which are formed projecting sprocket-teeth $b'$, of usual character. The front or acting edges of the teeth are in Figure 1 shown as slightly worn.

When the chain A is mounted upon a sprocket wheel of the ordinary character shown, the sprocket teeth of the wheel extend through the hollow center of alternate links of the chain, as illustrated, and the acting edge of each tooth is in contact with the knuckle of the link adjacent to the link through which said tooth extends,—with the result that by virtue of the pressure exerted by said tooth upon said knuckle or of said knuckle upon said tooth, according as the gear wheel is a driving or driven wheel, and of the friction occasioned by the sliding of said knuckle down the edge of said tooth, and again up the edge of said tooth at the time of its engagement by and disengagement from said tooth, a very considerable wearing away of said tooth and knuckle occurs.

Furthermore, in the frequent changing of the angle of inclination of each link to its neighbor in the use of the chain, a considerable wearing is occasioned by the rotation of the transverse bars $a'$ within the hollow interiors of the knuckles $a^3$.

As a result of the construction and operation described, the circumferential breadth of the teeth from front to rear becomes diminished, the lengths of the hollow interiors of the links become increased, and by the wearing away of the exterior faces of the bars $a'$ and of the interiors of the knuckles $a^3$, the chain becomes lengthened, and hence the gear deteriorates and gives rise to the disadvantages hereinbefore referred to.

I interpose between the sprocket chain and the exterior rim or face of the sprocket gear wheel projections, which, while the parts remain unworn and in their normal condition and relation of action, will be without effect, but which,—as the links and teeth become worn, and, in consequence, the free or inactive ends of said links, that is to say, the ends not in operative contact with the teeth of the wheel, extend further away from the teeth and overlie a part of the rim of the wheel to which they did not theretofore reach,—will operate to raise said free or inactive ends of the links from the face of the wheel, and will thus take up the increase in the dimensions of the chain.

In the preferred embodiment of my invention shown in Figures 1, 2, and 3, the projections, designated C, are shown as interposed one between each pair of sprocket teeth, and as having inclined faces the bases of which exist at a point close to the point of contact of the knuckles of the links with the face of the wheel when the parts are unworn.

As, then, the faces $b^\times$ of the teeth $b$ and the knuckles $a^3$ of the links, wear away, so that the free or inactive ends of the links extend farther away from the teeth $b$ than when unworn, said free or inactive ends of the links will come in contact with and rest upon the inclined faces of the projections C (as shown in Figure 1), with the result that said ends will be raised slightly from the face of the wheel, the effect being the same as though the diameter of the wheel were slightly increased.

As will be understood, in proportion as the wearing away progresses the free or inactive ends of the links will rest upon correspondingly higher portions of the inclined faces of the projections C, and the compensation for the wearing away of the parts will accordingly be in exact proportion to the extent of the wear.

Figure 4:
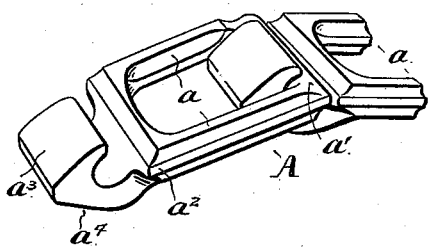
Figures 4 and 5 represent respectively sections of a sprocket chain, and of a sprocket wheel, illustrating a modified form of my invention.
Figure 5:
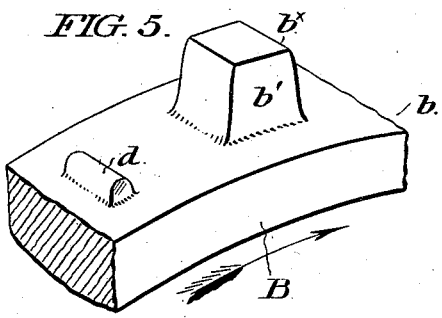

Obviously the invention may be embodied in a variety of forms, and in Figures 4 and 5 I illustrate one possible modification.

In said figure, instead of forming an inclined projection C on the face of the wheel, I form the knuckles $a^3$ of the sprocket chain with inclined under faces $a^4$,—(see Figure 4), and provide the face of the wheel with projections $d$, being merely bosses existing between the adjacent teeth of the wheel.

Of course, in this construction the proportioning of the parts is preferably such that the inclined faces $a^4$ of the links do not rest upon the projections $d$ until the teeth and links have become slightly worn.

The operation of the embodiment of my invention illustrated in Figures 4 and 5 is identical with that exhibited in Figures 1, 2, and 3.

Preferably the face of the rim of the sprocket wheel is flattened between each two sprocket teeth $b'$, as shown in Figure 1, so that the said rim becomes a polygon instead of a true circle,—with the result that the particular joints of the chain which come between the sprocket teeth and lie upon the flat spaces thus formed are, when the parts are not worn away, bent or flexed less than would be the case were the face of the rim a true circle, and hence not only may a chain of the minimum length be employed,—but when the chain becomes worn and the ends of the links ride upon the inclined projections, the angle of deflection of said links will be the more acute and the efficiency of the apparatus correspondingly enhanced.

Having thus described my invention, I claim—

A sprocket wheel, embodying teeth, and a series of inclined projections on the rim face of the wheel, integral with the wheel, in alinement with the teeth of the wheel, and alternating with said teeth, substantially as set forth.

In testimony that I claim the foregoing as my invention I have hereunto signed my name this 26th day of December, A. D. 1896.

THOS. S. BROWN.

In presence of—
RICHARD E. CONNELL,
GEORGE WOOD.